(12) United States Patent
Sugawara

(10) Patent No.: US 10,609,228 B2
(45) Date of Patent: Mar. 31, 2020

(54) IMAGE FORMING APPARATUS AND CONTROL METHOD FOR PRINTING FILE ATTACHMENTS OF ELECTRONIC MAIL

(71) Applicant: CANON KABUSHIKI KAISHA, Tokyo (JP)

(72) Inventor: Kazuhiro Sugawara, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/863,502

(22) Filed: Jan. 5, 2018

(65) Prior Publication Data
US 2018/0131820 A1    May 10, 2018

Related U.S. Application Data

(63) Continuation of application No. 15/133,009, filed on Apr. 19, 2016, now Pat. No. 9,888,134.

(30) Foreign Application Priority Data

Apr. 23, 2015    (JP) .................. 2015-088798

(51) Int. Cl.
*H04N 1/00* (2006.01)
*H04L 12/58* (2006.01)

(52) U.S. Cl.
CPC ......... *H04N 1/00212* (2013.01); *H04L 51/08* (2013.01); *H04L 51/22* (2013.01); *H04N 1/00217* (2013.01); *H04N 2201/0094* (2013.01)

(58) Field of Classification Search
CPC ........... H04N 1/00212; H04N 1/00204; H04N 2201/0094; H04L 51/08

USPC .................. 358/1.15, 1.14, 402, 404, 405
See application file for complete search history.

(56) References Cited

U.S. PATENT DOCUMENTS

| | | | | |
|---|---|---|---|---|
| 5,832,218 | A  * | 11/1998 | Gibbs ................. | G06Q 10/107 709/203 |
| 9,888,134 | B2 * | 2/2018 | Sugawara .......... | H04N 1/00212 |
| 2010/0174794 | A1 | 7/2010 | Ochi | |
| 2013/0335771 | A1 | 12/2013 | Sugiura | |
| 2014/0355070 | A1 * | 12/2014 | Murakawa ......... | H04N 1/00212 358/400 |
| 2016/0261540 | A1 * | 9/2016 | Yamane ............... | H04L 41/026 |

FOREIGN PATENT DOCUMENTS

| | | |
|---|---|---|
| CN | 101155152 A | 4/2008 |
| CN | 101854742 A | 10/2010 |

* cited by examiner

*Primary Examiner* — Jamares Q Washington
(74) *Attorney, Agent, or Firm* — Canon U.S.A., Inc. IP Division

(57) ABSTRACT

An image forming apparatus and method that prevents an image based on a file attached to an electronic mail from being repeatedly printed includes receiving an electronic mail from a mail server, printing an image based on the file attached to the received electronic mail, and deleting the electronic mail from the mail server after the image is printed. If the electronic mail cannot be deleted from the mail server, identification information corresponding to the undeleted electronic mail is stored, and the image based on the file attached to the electronic mail corresponding to identification information coinciding with the stored identification information is not printed.

15 Claims, 12 Drawing Sheets

FIG.8A

| IDENTIFICATION INFORMATION OF E-MAIL (UID) | ~801 |
|---|---|
| "AAg9EBAAAAgsJ0QAPHknJaU2bhWqs9cx" | |

FIG.8B

| INDEX | IDENTIFICATION INFORMATION OF E-MAIL (UID) |
|---|---|
| 1 | "AAg9EBAAAAgsJ0QAPHknJaU2bhWqs9cx" |
| 2 | "ABg9EBAAAAgsJ0QAPHknJaU2bhWqs9cx" |
| 3 | "ACg9EBAAAAgsJ0QAPHknJaU2bhWqs9cx" |
| ... | ............ |
| N−1 | "" |
| N | "" |

~802

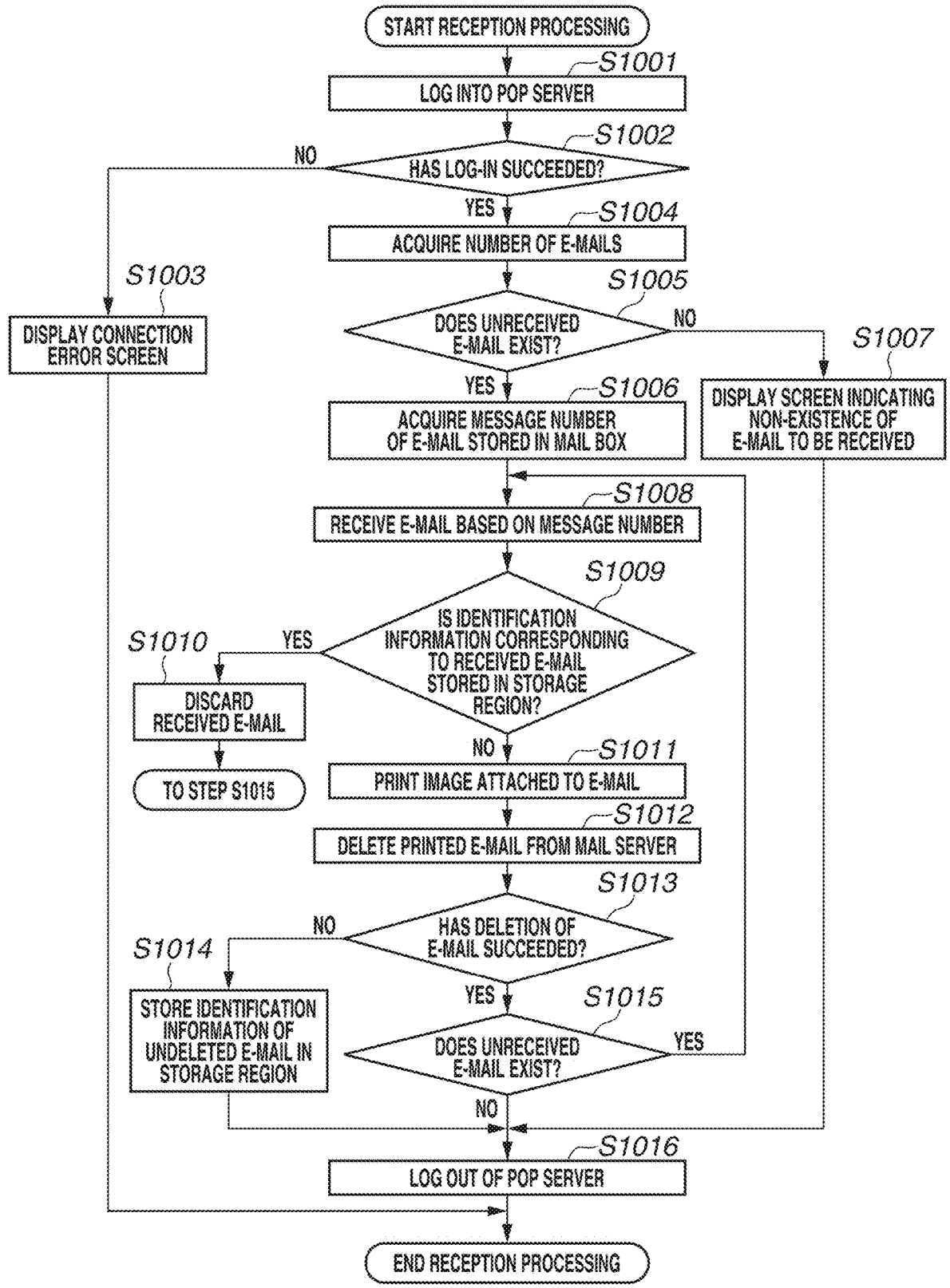

IMAGE FORMING APPARATUS AND CONTROL METHOD FOR PRINTING FILE ATTACHMENTS OF ELECTRONIC MAIL

CROSS-REFERENCE TO RELATED APPLICATION

This application is a continuation, and claims the benefit, of U.S. patent application Ser. No. 15/133,009 filed Apr. 19, 2016, which claims the benefit of Japanese Patent Application No. 2015-088798 filed Apr. 23, 2015. Each of U.S. patent application Ser. No. 15/133,009 and Japanese Patent Application No. 2015-088798 is hereby incorporated by reference herein in its entirety.

BACKGROUND

Field of the Invention

Aspects of the present invention generally relate to an image forming apparatus for printing an image based on a file attached to an electronic mail (e-mail).

Description of the Related Art

There has been known an image forming apparatus having a function of receiving an e-mail from a mail server and printing an image based on a file attached to the received e-mail. The image forming apparatus having the above function can receive an e-mail from the mail server at a predetermined time or according to an instruction manually provided by a user. Further, there has been known that the above-described image forming apparatus deletes an e-mail stored in the mail server after receiving that e-mail. Japanese Patent Application Laid-Open No. 2002-152450 discusses an image forming apparatus that receives an e-mail and deletes that e-mail from a mail server after an image thereof has been printed.

If an e-mail is to be deleted after the image has been printed, it can take some time to delete the e-mail after reception. The time taken for deletion after reception of the e-mail is longer if the number of printing sheets is greater and time taken for printing is longer.

If it takes time to delete the e-mail after reception, a network failure may occur when the image is being printed after reception of the e-mail, so that the e-mail cannot be deleted from the mail server.

In a case where the e-mail cannot be deleted, the e-mail to be deleted may remain stored in the mail server. In such a case, if the image forming apparatus issues an inquiry to the mail server in order to receive a new e-mail after the network failure is solved, an e-mail corresponding to a printed image is received again, and the same image may be undesirably printed repeatedly.

SUMMARY

Aspects of the present invention are directed to a technique capable of preventing an image based on an attached file of an e-mail from being printed repeatedly even in a case where a network failure has occurred.

According to an aspect of the present invention, an image forming apparatus includes a reception unit configured to receive an electronic mail from a mail server, a printing unit configured to print an image that is based on an attached file of the electronic mail and received by the reception unit, a deletion unit configured to delete the received electronic mail from the mail server after the image that is based on the attached file of the received electronic mail is printed by the printing unit, a storage unit configured to store identification information of the electronic mail in a case where the deletion unit cannot delete the received electronic mail from the mail server, and a control unit configured to execute control not to print the image that is based on the attached file of the electronic mail corresponding to the identification information stored in the storage unit in a case where a condition for receiving the electronic mail by the reception unit is satisfied.

Further features of aspects of the present invention will become apparent from the following description of exemplary embodiments with reference to the attached drawings.

BRIEF DESCRIPTION OF THE DRAWINGS

FIGS. 8A and 8B are diagrams illustrating data models of a storage region in which identification information is stored.

FIG. 10 is a flowchart illustrating control processing for receiving and printing an e-mail.

DESCRIPTION OF THE EMBODIMENTS

Exemplary embodiments of the present invention will be described in detail with reference to the appended drawings. Further, the exemplary embodiments described below are not intended to limit the content of aspects of the invention according to the appended claims, and not all of the combinations of features described in the exemplary embodiments are required as the solutions of aspects of the present invention.

Figure 1:
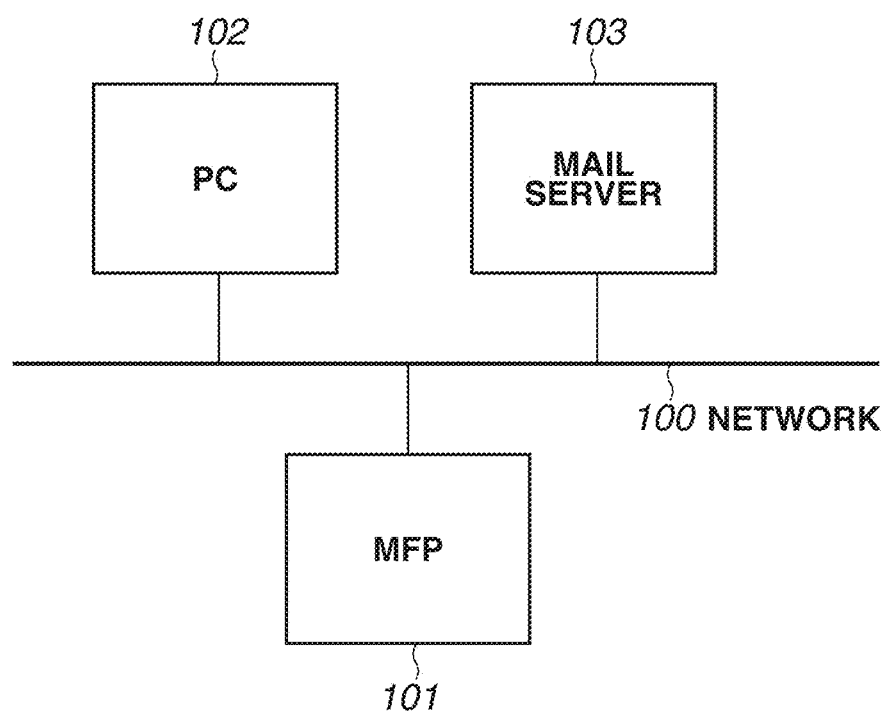
FIG. 1 is a block diagram illustrating an overall view of an image forming system.

A first exemplary embodiment of the present invention will be described. FIG. 1 is a block diagram illustrating an image forming system according to the present exemplary embodiment. A multifunction peripheral (MFP) 101, a personal computer (PC) 102, and a mail server 103 are communicably connected to each other on a network 100. In the present exemplary embodiment, the MFP 101 and the PC 102 are respectively described as examples of an image forming apparatus and an information processing apparatus. The MFP 101 and the PC 102 are connected to the internet (not illustrated) through the network 100, so that e-mails can be transmitted to and received from an external apparatus via a plurality of mail servers.

A mail client is installed in the PC 102. The mail client is software that enables the PC 102 to transmit a created e-mail to an external apparatus (i.e., an information processing apparatus similar to the PC 102 or an image forming apparatus) via the mail server 103 or to receive an e-mail from the external apparatus and display an e-mail.

The mail server 103 receives an e-mail transmitted from a mail client of a sender (i.e., transmission source). The received e-mail is sorted to a mail box provided for each e-mail address and stored in a storage unit (not illustrated). In addition, each e-mail address is managed in association with user information such as a user name and a password. The stored e-mail is distributed according to a request from a mail client of a receiver (i.e., transmission destination).

Further, the mail client of the PC 102 can receive the e-mail sorted to the mail box of the mail server 103 by using a communication protocol such as post office protocol-version 3 (POPS) or internet message access protocol (IMAP). In addition, a similar mail client is also installed in the MFP 101.

The MFP 101 includes a reading function of reading an image on a sheet and a printing function of printing an image on a sheet. Further, the MFP 101 can receive an e-mail transmitted from the PC 102 or other image forming apparatuses (not illustrated) via the mail server 103. Furthermore, the MFP 101 can print an image based on the attached file of the received e-mail. The MFP 101 can receive or print an e-mail transmitted based on internet facsimile data transmission system T.37 (InternetFAX (I-Fax)) compliant with the International Telecommunication Union Telecommunication Standardization Sector (ITU-T) recommendation, or can transmit an e-mail to which an image is attached.

In the present exemplary embodiment, although the mail server 103 including both of the functions of a transmission server (simple mail transfer protocol (SMTP) server) and a reception server (post office protocol (POP) server) is described as an example, the configuration is not limited thereto. For example, a transmission server and a reception server may be provided separately in order to distribute the load thereof.

Figure 2:
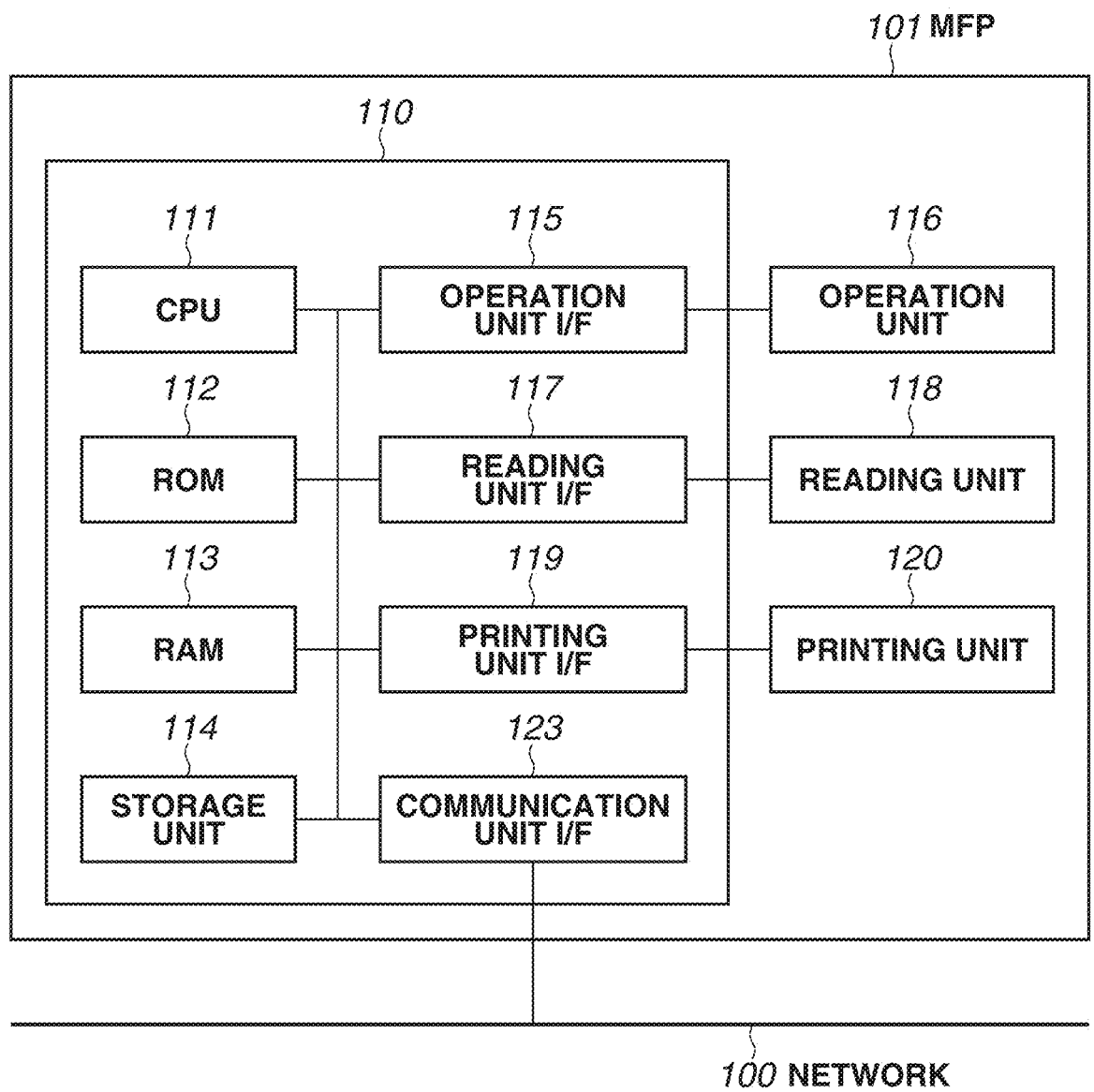
FIG. 2 is a block diagram illustrating a configuration of a multifunction peripheral (MFP).

FIG. 2 is a block diagram illustrating a configuration of the MFP 101 according to the present exemplary embodiment. A control unit 110 including a central processing unit (CPU) 111 controls an overall operation of the MFP 101. The CPU 111 reads a control program stored in a read only memory (ROM) 112 or a storage unit 114 to execute various kinds of control such as reading control and printing control. The ROM 112 stores a control program executable by the CPU 111. In addition, the ROM 112 stores a boot sequence and font information. A random access memory (RAM) 113 is a main memory of the CPU 111 and used as a work area or a temporary storage region for loading various control programs stored in the ROM 112 or the storage unit 114. The storage unit 114 stores image data, printing data, various programs, and various kinds of setting information. In the present exemplary embodiment, although it is assumed that a flash memory is used as the storage unit 114, an auxiliary storage device such as a solid state drive (SSD) or a hard disk drive (HDD) may be used therefor.

Further, in the MFP 101 according to the present exemplary embodiment, although a single CPU 111 uses a single memory (RAM 113) to execute respective steps of processing illustrated in the below-described flowcharts, another configuration may be employed therefor. For example, a plurality of CPUs, RAMs, ROMs, and storage units may cooperatively execute the respective steps of processing illustrated in the below-described flowcharts. Furthermore, a part of the processing may be executed by using a hardware circuit such as an application specific integrated circuit (ASIC) or a field programmable gate array (FPGA).

An operation unit interface (I/F) 115 connects an operation unit 116 to a control unit 110. The operation unit 116 displays information for a user and receives an instruction from the user.

A reading unit I/F 117 connects a reading unit 118 to the control unit 110. The reading unit 118 reads an image on a sheet and converts the read image into image data such as binary data. The image data generated by the reading unit 118 is transmitted to an external apparatus or printed on a sheet.

A printing unit I/F 119 connects a printing unit 120 to the control unit 110. The CPU 111 transfers an image to be printed (i.e., printing target image data) to the printing unit 120 via the printing unit I/F 119. The printing unit 120 prints an image on a sheet fed from a sheet feeding cassette (not illustrated). A printing system of the printing unit 120 may be an electro-photographic system or an ink jet system. Alternatively, other printing systems may be employed therefor.

Further, the control unit 110 is connected to the network 100 via a communication unit I/F 123. The communication unit I/F 123 transmits image data or information to the external apparatus on the network 100, and receives printing data or information from the information processing apparatus on the network 100. For example, the MFP 101 can execute the above-described transmission/reception of an e-mail and transmission using other protocols such as a file transfer protocol (FTP) and a server message block (SMB) via the communication unit I/F 123.

Figure 3:
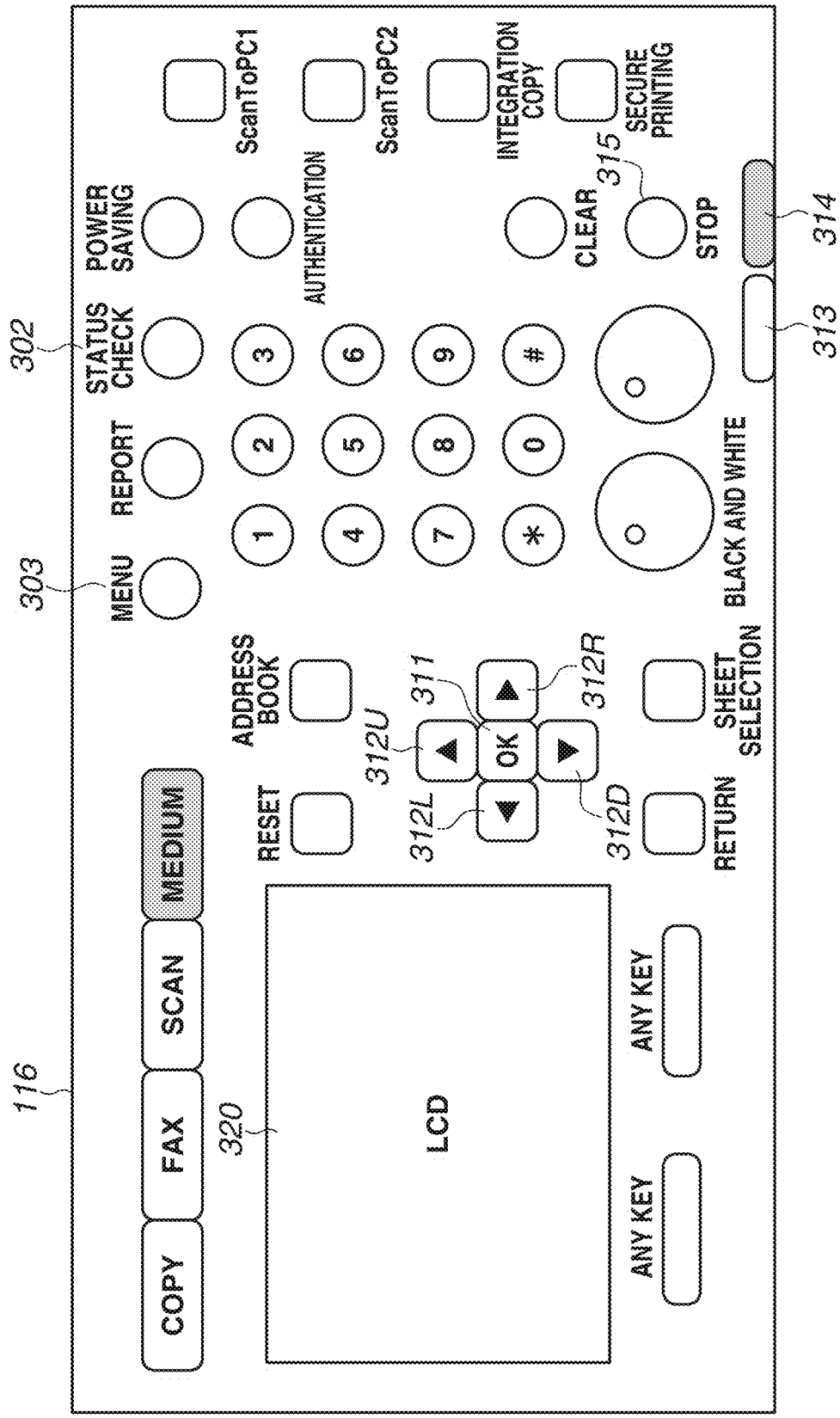
FIG. 3 is a diagram illustrating an external view of an operation unit.

FIG. 3 is a diagram illustrating an external view of the operation unit 116. The operation unit 116 includes a touch panel (hereinbelow, "panel") 320 for displaying an operation screen and various hard keys described below. Each of the panel 320 and various hard keys functions as an acceptance unit for accepting an instruction from the user.

A scroll key 312 for selecting options on a screen displayed on the panel 320 and an OK key 311 for determining the option selected by the scroll key 312 are provided on the operation unit 116. The user can specify an item from the options on the screen by using the scroll key 312 and the OK key 311. The user can also specify an option by directly touching the option displayed on the panel 320 with an object such as a finger or a stylus pen.

Lamps 313 and 314 notify the user of a status of the MFP 101. The lamp 313 is lit up when an e-mail is being received or printed, and the lamp 314 is lit up when any error has occurred in the MFP 101.

A stop key 315 is a key for stopping the processing executed by the MFP 101. In the present exemplary embodiment, the stop key 315 is used in order to cancel reception processing of an e-mail or printing processing of an image based on the attached file of the e-mail.

A status check key 302 is a key for displaying a screen (status check screen) for checking a status of the MFP 101. In the present exemplary embodiment, the user can check the status of the MFP 101 or make an inquiry about an e-mail via the status check screen.

Figure 4:
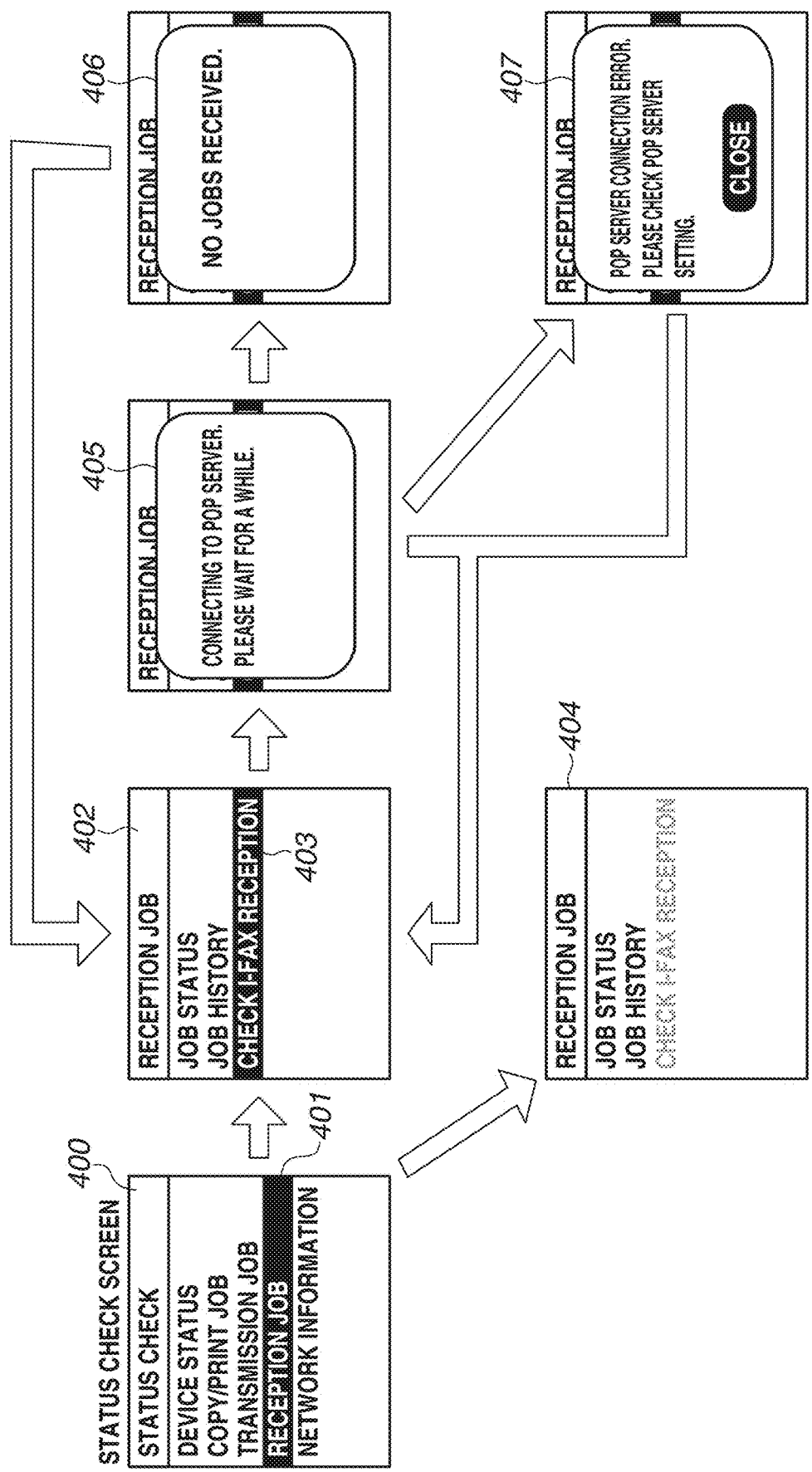
FIG. 4 is a diagram illustrating operation screens displayed on a panel.

Here, functions of the status check screen according to the present exemplary embodiment will be described. First, the user can check the statuses of jobs or the MFP 101 by pressing the status check key 302. FIG. 4 is a diagram illustrating examples of the status check screen displayed on the panel 320 of the operation unit 116 by the CPU 111.

When the status check key 302 is pressed, the CPU 111 displays a status check screen 400 on the panel 320. The user can check a job execution status or history information of the MFP 101 via the status check screen 400. Further, the user can check a device status such as a remaining amount of sheets or color materials (i.e., toner or ink) used for printing. Furthermore, the user can check another status of the MFP 101 such as error or warning information as a device status.

Further, the user can execute an operation relating to reception job through the status check screen 400. An option 401 described below in detail is used in order to check a reception job status or execute manual reception of the e-mail.

<Reception Print Function>

Next, description will be given to a reception print function of printing an image (hereinbelow, also referred to as "received image") based on the attached file of the received e-mail. The reception print function is a function of receiving and printing the I-fax described above. In addition, the reception print function may also support an e-mail that is not compliant with the T.37 system. In such a case, for example, an e-mail to which a portable document format (PDF) file that is not compliant with the I-Fax standard is attached may be received and printed.

In the reception print function according to the present exemplary embodiment, the CPU 111 makes an inquiry to the POP server to receive and prints an e-mail. The user can input an instruction for manually receiving the e-mail through the operation unit 116. Further, the CPU 111 can automatically make an inquiry at each inquiry interval set to the MFP 101.

Next, the reception print function will be described by taking an operation for manually making an inquiry of the POP server as an example. In the present exemplary embodiment, an address of the POP server necessary for communicating with the POP server and user information such as a user ID and a password necessary for the authentication executed by the POP server are previously set by a manager and stored in the storage unit 114.

The user can input an instruction for making an inquiry to the POP server via a reception job screen 402 illustrated in FIG. 4. In a case where an option 403 is specified through the operation unit 116, the CPU 111 starts making an inquiry to the POP server. Further, the CPU 111 displays a pop-up screen 405 on the panel 320 in order to notify the user that the MFP 101 is being connected to the POP server.

The CPU 111 blinks the lamp 313 when the e-mail is being received. On the other hand, the CPU 111 lights up the lamp 313 when the e-mail has been received and an image based on the attached file of the e-mail is being printed. Through the above processing, the user can determine a status of the reception print function by viewing the state of the lamp 313. In the present exemplary embodiment, although a receiving status is notified through the lamp 313, the receiving status may be displayed on the panel 320.

After the printing processing has been completed, the CPU 111 deletes the e-mail from the POP server and ends the reception print processing.

On the other hand, in a case where the e-mail to be received does not exist in the POP server, the CPU 111 displays a pop-up screen 406 and ends the reception print processing. In a case where a predetermined time (e.g., 2 seconds) previously set thereto has passed while the pop-up screen 406 is being displayed thereon, the CPU 111 closes the pop-up screen 406 and shifts the screen to the screen 402.

In a case where the image has been printed or an e-mail to be received does not exist, the CPU 111 turns off the lamp 313.

Further, in a case where the MFP 101 cannot communicate with the POP server because of a network failure or an authentication error of the POP server, the CPU 111 may close the pop-up screen 405 and display a pop-up screen 407. The pop-up screen 407 is a screen for notifying the user of a communication error, and is continuously displayed until the user operates a close key.

Furthermore, in a case where a group 3 (G3) facsimile transmission/reception operation using a modem (not illustrated) or a printing operation based on page description language (PDL) data is being executed, the CPU 111 determines that the reception print function is not executable and causes the option 403 not to be selectable. A screen 404 is an example of a screen in which the option 403 is brought into a non-selectable state and displayed in gray because the CPU 111 determines that the reception print function is not executable. Further, the manager of the MFP 101 can make a setting for disabling the reception print function itself through a management setting (not illustrated). In a case where the reception print function is set to "OFF", the CPU 111 also displays the option 403 in gray.

On the other hand, in a case where an inquiry is made automatically, the CPU 111 receives and prints the e-mail in a background without displaying the screen illustrated in FIG. 4 on the panel 320. In this case, the user can view the state of the lamp 313 to determine the status of the reception print function being executed automatically. In addition, the CPU 111 limits a part of the function that can be executed by the MFP 101 when the e-mail is being received and printed in the background. For example, the CPU 111 executes control to disable a function such as a copying function or a printing function of a print job, which uses the hardware that conflicts with the hardware used by the reception print function. On the other hand, the CPU 111 executes control to enable a function such as a function for reading and transmitting a document, which uses the hardware that does not conflict with the hardware used by the reception print function. In a case where the MFP 101 cannot communicate with the POP server when an inquiry is to be made automatically, the CPU 111 displays an icon for displaying supplemental information indicating that the POP server is not connectable, on the status check screen 400 for checking a status of the MFP 101 instead of displaying the pop-up screen.

Figure 9A:
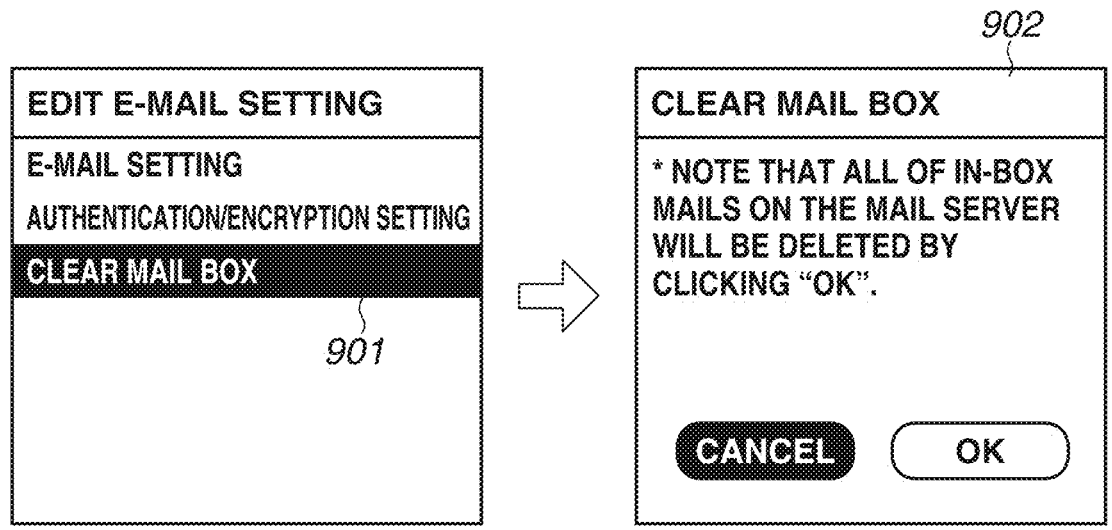
FIGS. 9A and 9B are diagrams illustrating operation screens displayed on the panel.
Figure 9B:
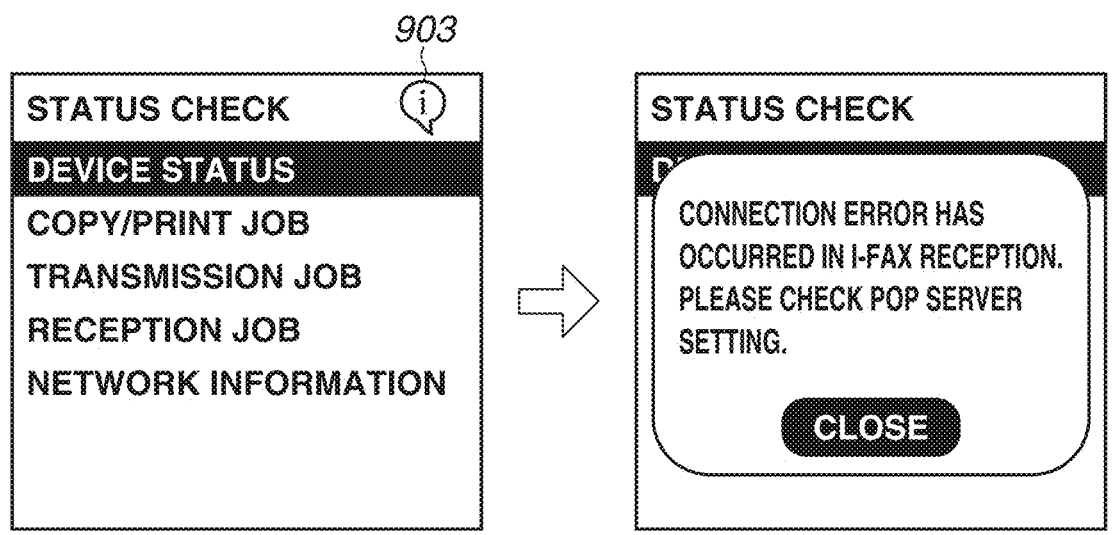

FIGS. 9A and 9B are diagrams illustrating examples of screens displayed on the panel 320 of the operation unit 116 by the CPU 111, and FIG. 9B is a diagram illustrating the screens for checking a status. In a case where the user specifies an icon 903, the CPU 111 displays information indicating that the CPU 111 cannot communicate with the POP server. Once the user specifies the icon 903, the CPU 111 hides the icon 903 on the status check screen 400. In the present exemplary embodiment, the icon 903 serves as a trigger for displaying an error message or a warning message, so that the icon 903 is also used when another error message or warning message is displayed.

Accordingly, in a case where the user is executing another function, an error occurring in the reception print function can be notified to the user through the status check screen 400 while the pop-up screen of the reception print function executed in the background can be suppressed from being displayed thereon. In the present exemplary embodiment, although a case where the icon 903 is displayed on the status check screen 400 has been described as an example, it is not limited thereto. For example, the user interface may be designed in such a manner that a status bar is displayed on the upper side of the panel 320, so that an icon or error information may be displayed on the status bar. Any configuration may be employed as long as the error information can be displayed without interrupting the screen provided by the function executed in a foreground.

Further, in the reception print function according to the present exemplary embodiment, in order to enable the MFP 101 to receive and print the e-mail again in a case where printing of the image based on the attached file of the e-mail has failed because of occurrence of a jam, the e-mail is deleted after the image has been printed. In such a case, it may take some time to delete the e-mail after reception of the e-mail. Time taken for deletion after reception of the e-mail is longer if the number of printing sheets is greater and time taken for printing is longer.

If it takes time to delete the e-mail after reception, a network failure may occur when the image is being printed after reception of the e-mail, so that the e-mail cannot be deleted from the mail server 103.

In a case where the e-mail cannot be deleted, the e-mail to be deleted may be left stored in the mail server 103. In such a case, if the MFP 101 makes an inquiry to the mail server 103 in order to receive a new e-mail after the network failure is solved, an e-mail corresponding to the printed image is received again, so that the same image may be undesirably printed repeatedly.

With respect to the above problem, in the present exemplary embodiment, description will be given of control processing for preventing an image based on the attached file of the e-mail from being undesirably printed repeatedly even in a case where the network failure has occurred.

Figure 5:
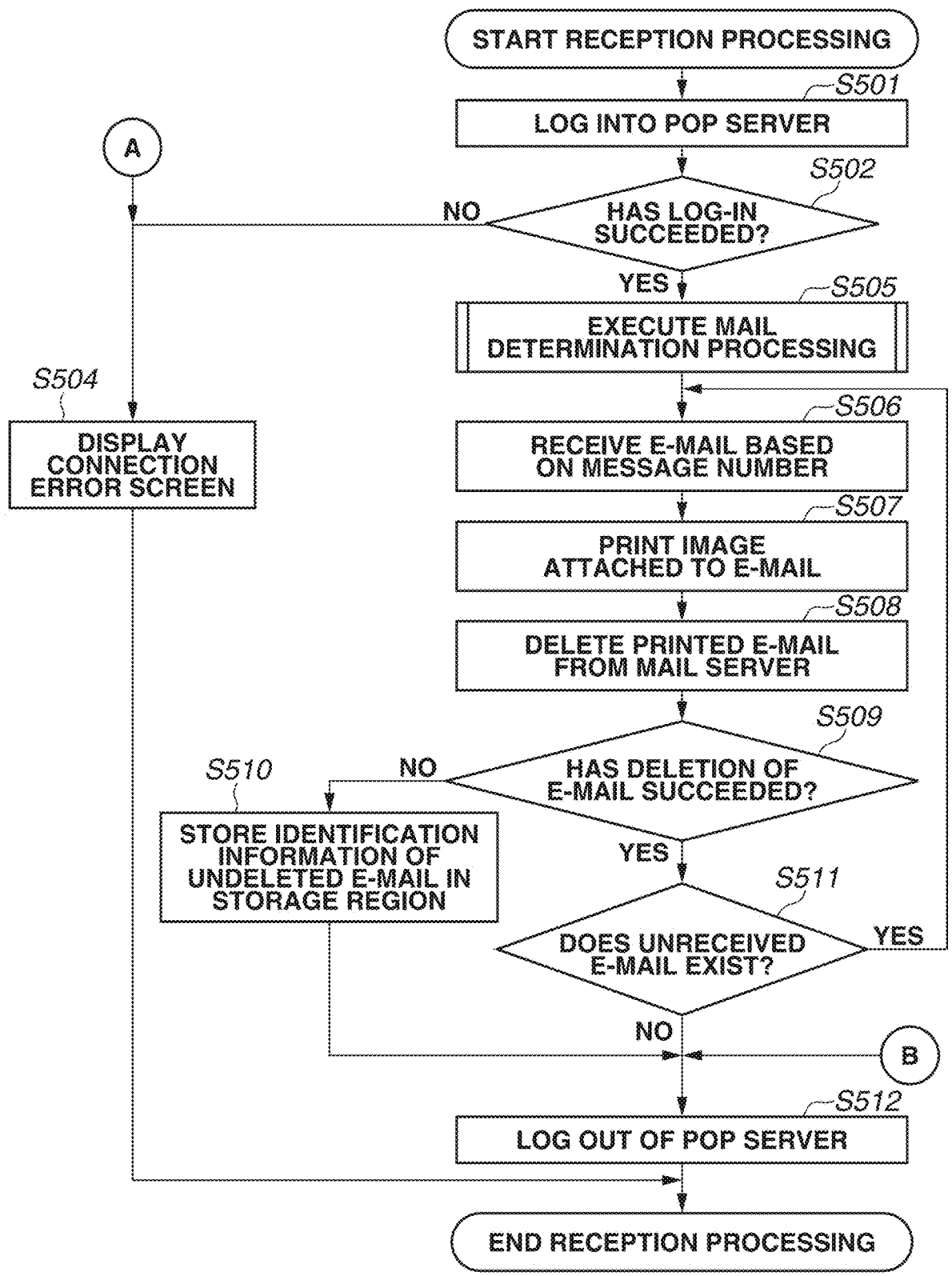
FIG. 5 is a flowchart illustrating control processing for receiving and printing an e-mail.
Figure 6:
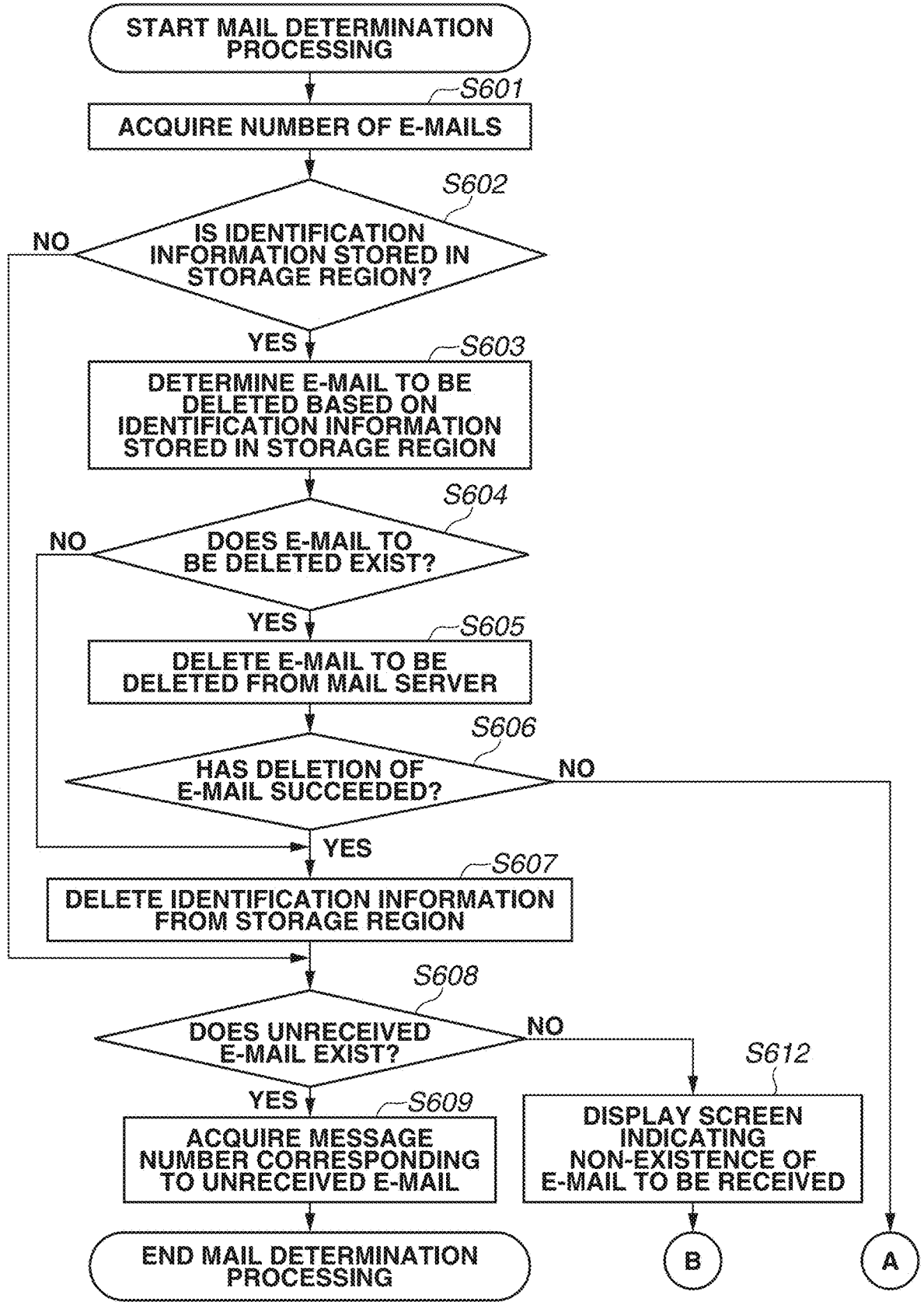
FIG. 6 is a flowchart illustrating control processing for receiving and printing an e-mail.

The specific control will be described with reference to the flowcharts in FIGS. 5 and 6. Respective operations (steps) of the flowcharts illustrated in FIGS. 5 and 6 are realized when the CPU 111 reads, onto the RAM 113, and executes a control program stored in the ROM 112 or the storage unit 114. The CPU 111 executes the control corresponding to the flowchart illustrated in FIG. 5 in a case where an instruction for manually receiving the e-mail is input thereto or the CPU 111 makes an inquiry to the POP server at every automatic reception interval set thereto.

In step S501, the CPU 111 transmits the user ID and the password stored in the storage unit 114 to the POP server to make a log-in (authentication) request. In step S502, in a case where the log-in to the POP server has succeeded (YES in step S502), the processing proceeds to step S505. In a case where the log-in to the POP server has failed (NO in step S502), the processing proceeds to step S504.

In step S504, the CPU 111 displays an error screen as illustrated in the screen 407 on the panel 320 and ends the reception processing of the e-mail.

On the other hand, in step S505, the CPU 111 determines the e-mail to be received from the POP server. The processing to be performed in step S505 will be described with reference to the flowchart in FIG. 6 below.

In step S601, the CPU 111 acquires the number of e-mails stored in the mail box of the POP server. The CPU 111 transmits a STAT command to the POP server and waits for a response from the POP server. The STAT command is a command for checking the number of e-mails and a size of data stored in the mail box. The CPU 111 receives a response from the POP server and stores the acquired number of e-mails in the RAM 113 as the number of unreceived e-mails, and the processing proceeds to step S602.

In step S602, the CPU 111 determines whether identification information is stored in the storage region in the RAM 113. FIGS. 8A and 8B are diagrams illustrating storage regions in which the identification information is stored. In a case where the identification information is stored (YES in step S602), the processing proceeds to step S603. In a case where the identification information is not stored (NO in step S602), the processing proceeds to step S608.

The identification information for uniquely identifying the e-mail (i.e., unique identifier (UID)) is stored in the storage region illustrated in FIG. 8A. The identification information is generated by the mail server 103 by combining a processing ID and time information, in order to prevent the identification information from overlapping with each other within the same mail box. The identification information of the e-mail, an attached image of which has been printed, but cannot be deleted from the mail server 103, is stored in this storage region.

In the present exemplary embodiment, although a case where the storage region for storing the identification information is provided on the RAM 113 is described as an example, is not limited thereto. For example, the storage region for storing the identification information may be provided on the storage unit 114.

Referring back to FIG. 6, in step S603, the CPU 111 determines the e-mail to be deleted based on the identification information stored in the above-described storage region. More specifically, the CPU 111 transmits a UIDL command to the POP server and acquires identification information (UID) of each e-mail stored in the mail box. In addition, a message number for identifying the e-mail is sequentially assigned thereto in an order starting from 1 based on an order in which the e-mails have reached the mail box. The message number is a number valid in a same communication session, and the number will not be reassigned as long as the same communication session is established between the POP server and the MFP 101.

The CPU 111 compares the acquired identification information with the identification information stored in the storage region. After making the above comparison, in a case where the acquired identification information coincides with the identification information stored in the storage region, the e-mail corresponding to that identification information is determined to be the e-mail to be deleted. In a case where a plurality of e-mails is stored in the mail box, the CPU 111 makes a comparison on each of corresponding identification information in order to determine the e-mail to be deleted.

In step S604, the CPU 111 determines whether the e-mail to be deleted exists. In a case where the e-mail to be deleted exists (YES in step S604), the processing proceeds to step S605. In a case where the e-mail to be deleted does not exist (NO in step S604), the processing proceeds to step S607.

In step S605, the CPU 111 transmits to the POP server a DELE command in which the message number corresponding to the e-mail to be deleted is specified, and instructs the POP server to delete the corresponding e-mail from the mail box. In addition, the DELE command is a command for deleting the e-mail of the specified message number.

In step S606, according to the response from the POP server, the CPU 111 determines whether deletion of the e-mail has succeeded. In a case where an affirmative response (OK) is received from the POP server, the CPU 111 determines that deletion of the e-mail has succeeded (YES in step S606), and then, the processing proceeds to step S607. In addition, the CPU 111 decrements the number of unreceived e-mails.

On the other hand, in a case where the CPU 111 receives a negative response (NG) from the POP server, or the CPU 111 cannot receive a response from the POP server even though a predetermined time has elapsed, or the CPU 111 cannot access the network, the CPU 111 determines that deletion of the e-mail has failed (NO in step S606), then the processing proceeds to "A" (step S504) illustrated in FIG. 5. In step S607, the CPU 111 deletes the identification information from the storage region in the RAM 113, and the processing proceeds to step S608.

Next, in step S608, the CPU 111 determines whether the unreceived e-mail exists. In a case where the information stored in the RAM 113 indicates that the number of unreceived e-mails is "0" (NO in step S608), the processing proceeds to step S612. In a case where the number of unreceived e-mails is equal to or greater than "1" (YES in step S608), the processing proceeds to step S609. In step S612, the CPU 111 displays a screen indicating non-existence of the e-mail to be received, and the processing proceeds to "B" (step S512) illustrated in FIG. 5.

On the other hand, in step S609, the CPU 111 acquires the message number of the unreceived e-mail. More specifically, the CPU 111 generates a reception list in which the message number corresponding to the unreceived e-mail is associated with the identification information (UID) of that e-mail, and stores the reception list in the RAM 113. When the CPU 111 has acquired the message number of the unreceived e-mail, the processing proceeds to step S506.

Referring back to FIG. 5, in step S506, the CPU 111 transmits to the POP server a RETR command in which the message number corresponding to the e-mail to be received is specified and receives the e-mail. In addition, the CPU 111 determines the message number corresponding to the e-mail to be received based on the reception list (not illustrated). Here, even if a plurality of unreceived e-mails exists, the CPU 111 receives one e-mail from among a plurality of the unreceived e-mails.

In step S507, the CPU 111 decodes the file attached to the e-mail and generates an image used for printing. Next, a sheet to be used for printing is fed to the printing unit 120 and the CPU 111 controls the printing unit 120 to print the generated image on the sheet. After the printing is executed on the sheet, the processing proceeds to step S508.

In step S508, the CPU 111 transmits to the POP server a DELE command in which the message number corresponding to the printed e-mail is specified, and instructs the POP server to delete the corresponding e-mail from the mail box.

In step S509, according to the response from the POP server, the CPU 111 determines whether deletion of the e-mail has succeeded. In a case where an affirmative response (OK) is received from the POP server, the CPU 111 determines that deletion of the e-mail has succeeded (YES in step S509), and then, the processing proceeds to step S511. In addition, the CPU 111 decrements the information relating to the number of unreceived e-mails stored in the RAM 113. On the other hand, in a case where the CPU 111 receives a negative response (NG) from the POP server, or the CPU 111 cannot receive a response from the POP server even though a predetermined time has elapsed, or the CPU 111 cannot access the network, the CPU 111 determines that deletion of the e-mail has failed (NO in step S509), and then, the processing proceeds step S510.

In step S510, the CPU 111 stores the identification information (UID) of the e-mail that cannot be deleted in step S508 in the storage region in the RAM 113.

On the other hand, in step S511, the CPU 111 determines whether the unreceived e-mail exists. In a case where the information stored in the RAM 113 indicates that the number of unreceived e-mails is equal to or greater than "1" (YES in step S511), the CPU 111 increments the message number, and the processing returns to step S506. Accordingly, in step S506, the CPU 111 receives a next e-mail. On the other hand, in a case where the information stored in the RAM 113 indicates that the number of unreceived e-mails is "0" (NO in step S511), the processing proceeds to step S512.

In step S512, the CPU 111 logs out of the POP server. More specifically, the CPU 111 transmits a QUIT command to the POP server and ends the communication session with the POP server.

As described above, according to the present exemplary embodiment, when the e-mail an attached image of which has been printed is to be deleted, the identification information of the e-mail is stored if that e-mail cannot be deleted. Further, when the MFP 101 logs into the mail server 103 next time, reception processing of the e-mail is executed after the e-mail corresponding to the identification information coinciding with the stored identification information is deleted from the mail server 103. Accordingly, even in a case where a network failure has occurred, an image based on the attached file of the undeleted e-mail can be prevented from being printed repeatedly.

According to the configuration described in the first exemplary embodiment, in a case where the e-mail is to be received from the mail server 103, the reception processing of the e-mail has been executed after an e-mail corresponding to the identification information conforming to the stored identification information is deleted from the mail server 103. According to a second exemplary embodiment, in a case where the e-mail is to be received from the mail server 103, although an e-mail corresponding to the identification information coinciding with the stored identification information is not deleted, control processing is executed so as not to receive that e-mail. In addition, in the present exemplary embodiment, a hardware configuration of the apparatus regarded as a prerequisite is similar to that described in the first exemplary embodiment. Detailed description of the configuration similar to the first exemplary embodiment will be omitted.

Figure 7:
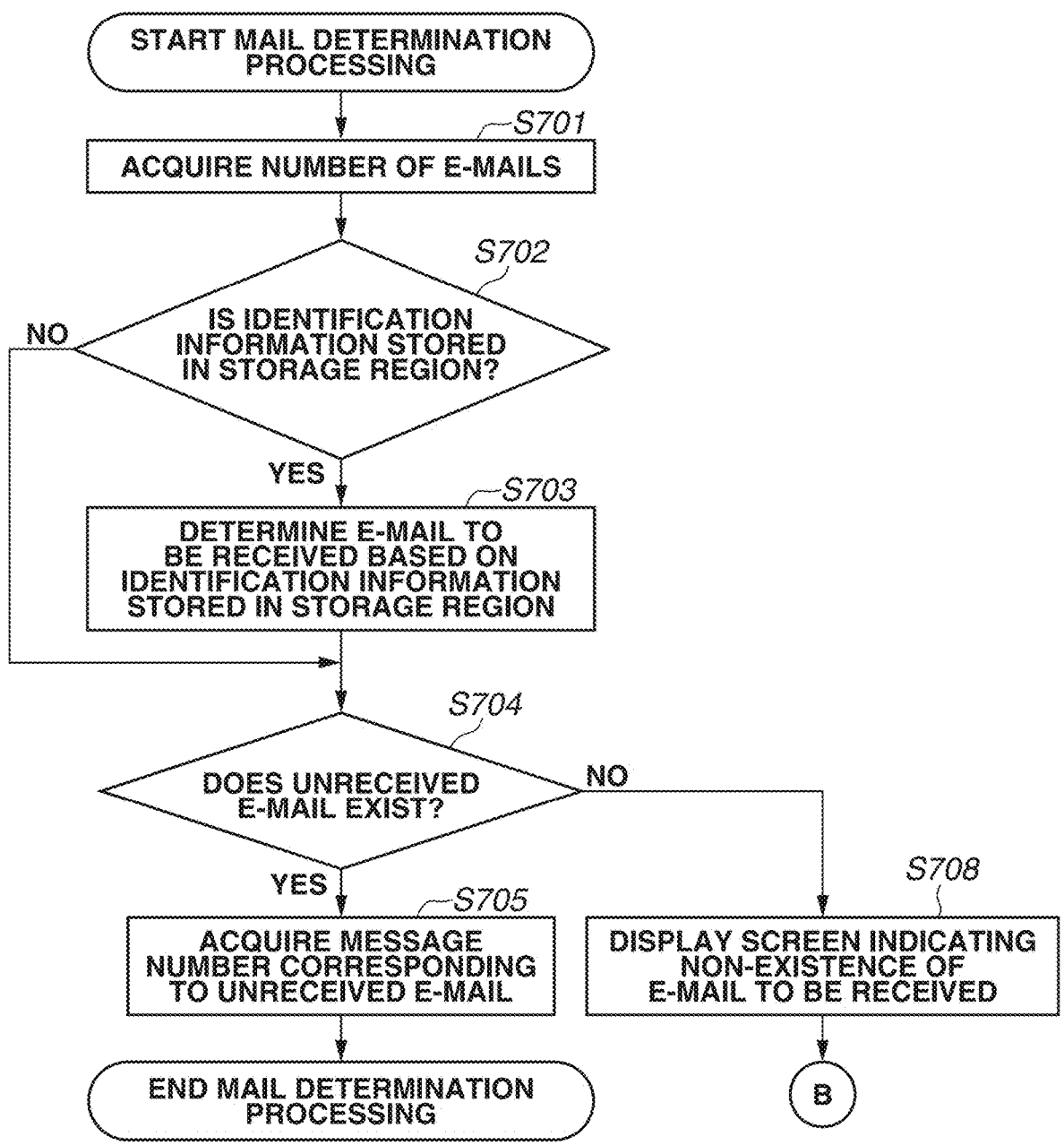
FIG. 7 is a flowchart illustrating control processing for receiving and printing an e-mail.

The specific control will be described with reference to the flowcharts in FIGS. 5 and 7. Respective operations (steps) of the flowcharts illustrated in FIGS. 5 and 7 are realized when the CPU 111 reads, onto the RAM 113, and executes a control program stored in the ROM 112 or the storage unit 114. The CPU 111 executes the control corresponding to the flowchart illustrated in FIG. 5 in a case where an instruction for manually receiving the e-mail is input thereto or the CPU 111 makes an inquiry to the POP server at every automatic reception interval set thereto.

In steps S501 and S502, similar to the first exemplary embodiment, the CPU 111 executes log-in processing with respect to the POP server. If the log-in processing with respect to the POP server has succeeded (YES in step S502), the processing proceeds to step S505. On the other hand, if the log-in processing with respect to the POP server has failed (NO in step S502), the processing proceeds to step S504. In step S504, the CPU 111 displays an error screen and ends the processing.

In step S505, the CPU 111 determines the e-mail to be received from the POP server. In the present exemplary embodiment, instead of the flowchart in FIG. 6 described in the first exemplary embodiment, the e-mail to be received is determined based on the flowchart in FIG. 7.

In step S701, the CPU 111 acquires the number of e-mails stored in the mail box of the POP server. The CPU 111 stores the acquired number of e-mails in the RAM 113 as the number of unreceived e-mails. Then, the processing proceeds to step S702.

In step S702, the CPU 111 determines whether the identification information is stored in the storage region in the RAM 113. FIG. 8B is a diagram illustrating a storage region in which the identification information according to the present exemplary embodiment is stored. The identification information corresponding to the e-mail, an attached image of which has been printed, but cannot be deleted from the mail server 103, is stored in this storage region. A plurality of pieces of identification information as illustrated in FIG. 8B can be stored in the storage region according to the present exemplary embodiment. For example, the storage region is configured of a ring buffer, so that a region at a leading end of the buffer (index of 1) is overwritten when a region at a trailing end thereof (index N) has become full. Accordingly, the storage region according to the present exemplary embodiment is managed by a first-in-first-out (FIFO) method. In a case where the identification information is stored in the storage region (YES in step S702), the processing proceeds to step S703. In a case where the identification information is not stored (NO in step S702), the processing proceeds to step S704.

In step S703, the CPU 111 determines the e-mail to be received based on the identification information stored in the storage region in the RAM 113. The CPU 111 transmits a UIDL command to the POP server and acquires identification information (UID) of each e-mail stored in the mail box. Next, the CPU 111 compares the acquired identification information with the identification information stored in the above-described storage region. As a result of the above comparison, in a case where the acquired identification information coincides with the identification information stored in the storage region, the e-mail corresponding to that identification information is determined to be the e-mail that is not to be received. On the other hand, as a result of the above comparison, in a case where the acquired identification information does not coincide with any of the identification information stored in the storage region, the e-mail corresponding to that identification information is determined to be the e-mail that is to be received. In a case where a plurality of e-mails is stored in the mail box, the CPU 111 compares each of corresponding identification information with the identification information stored in the storage region in order to determine the e-mail to be received. At this time, the CPU 111 calculates the number of e-mails to be received, and stores the calculated number of e-mails to be received in the RAM 113 as the number of unreceived e-mails as described above.

Next, in step S704, the CPU 111 determines whether the unreceived e-mail exists. In a case where the number of unreceived e-mails stored in the RAM 113 is "0" (NO in step S704), the processing proceeds to step S708. In a case where the number of unreceived e-mails is equal to or greater than "1" (YES in step S704), the processing proceeds to step S705.

In step S708, the CPU 111 displays a screen indicating non-existence of the e-mail to be received, and the processing proceeds to "B" illustrated in FIG. 5.

On the other hand, in step S705, the CPU 111 acquires the message number of the unreceived e-mail, and the processing proceeds to step S506.

Referring back to FIG. 5, in steps S506 to S508, the CPU 111 executes receiving processing, printing processing, and deletion processing of the e-mail, which are similar to those described in the first exemplary embodiment. In step S509, similar to the processing in step S509 described in the first exemplary embodiment, the CPU 111 determines whether deletion of the e-mail has succeeded. In a case where the CPU 111 determines that deletion of the e-mail has succeeded (YES in step S509), the CPU 111 decrements the information relating to the number of unreceived e-mails stored in the RAM 113, and the processing proceeds to step S511. On the other hand, in a case where the CPU 111 determines that deletion of the e-mail has failed (NO in step S509), the processing proceeds to step S510.

In step S510, the CPU 111 stores the identification information (UID) of the e-mail that cannot be deleted in step S508 in the storage region in the RAM 113 illustrated in FIG. 8B. More specifically, the CPU 111 stores the identification information in a region indicated by a write pointer (not illustrated) and increments the write pointer. For example, in a case where the write pointer indicates an index 2, the CPU 111 stores the identification information in a region of the index 2, and rewrites so that the write pointer indicates an index 3. Accordingly, a plurality of pieces of the identification information of the e-mails, attached images of which have been printed, but cannot be deleted from the mail server 103, is stored in the storage region.

On the other hand, in step S511, the CPU 111 determines whether the unreceived e-mail exists. In a case where the information stored in the RAM 113 indicates that the number of unreceived e-mails is equal to or greater than "1" (YES in step S511), the processing returns to step S506, so that the CPU 111 receives a next e-mail and executes printing processing of an image based on the attached file of the e-mail. On the other hand, in a case where the information stored in the RAM 113 indicates that the number of unreceived e-mails is "0" (NO in step S511), the processing proceeds to step S512.

In step S512, the CPU 111 logs out of the POP server. More specifically, the CPU 111 transmits a QUIT command to the POP server and ends the communication session with the POP server.

As described above, according to the present exemplary embodiment, when the e-mail an attached image of which has been printed is to be deleted, the identification information of the e-mail is stored if that e-mail cannot be deleted. Further, next time the MFP 101 logs into the mail server 103, it is possible to control the MFP 101 not to receive the e-mail corresponding to the identification information coinciding with the stored identification information. Accordingly, even in a case where the e-mail cannot be deleted from the mail server 103 because of a network failure, an image based on the attached file of the undeleted e-mail can be prevented from being printed repeatedly.

According to the configuration described in the first exemplary embodiment, in a case where the e-mail is received from the mail server 103, the reception processing of the e-mail has been executed after an e-mail corresponding to the identification information coinciding with the stored identification information is deleted from the mail server 103. According to a third exemplary embodiment, in a case where the e-mail stored in the mail server 103 is received, although an e-mail corresponding to the identification information coinciding with the stored identification information is received, control processing is executed not to print an image based on the attached file of that e-mail. In addition, in the present exemplary embodiment, a hardware configuration of the prerequisite apparatus is similar to that described in the first exemplary embodiment. Therefore, detailed description of the configuration similar to the first exemplary embodiment will be omitted.

The specific control will be described with reference to the flowchart in FIG. 10. Respective operations (steps) of the flowchart illustrated in FIG. 10 are realized when the CPU 111 reads, onto the RAM 113, and executes a control program stored in the ROM 112 or the storage unit 114. The CPU 111 executes the control corresponding to the flowchart illustrated in FIG. 10 in a case where an instruction of manually receiving the e-mail is input thereto or the CPU 111 makes an inquiry to the POP server at every automatic reception interval set thereto.

In steps S1001 and S1002, similar to the steps S501 and S502 described in the first exemplary embodiment, the CPU 111 executes log-in processing with respect to the POP server. If the log-in processing with respect to the POP server has succeeded (YES in step S1002), the processing proceeds to step S1004. On the other hand, if the log-in processing with respect to the POP server has failed (NO in step S1002), the processing proceeds to step S1003. In step S1003, the CPU 111 displays an error screen similar to that displayed in step S504 in the first exemplary embodiment, and ends the processing.

In step S1004, similar to the processing in step S601 described in the first exemplary embodiment, the CPU 111 transmits a STAT command to the POP server and acquires the number of e-mails stored in the mail box. Further, the CPU 111 stores the acquired number of e-mails in the RAM 113 as the number of unreceived e-mails, and the processing proceeds to step S1005.

Next, in step S1005, the CPU 111 determines whether the unreceived e-mail exists. In a case where the information stored in the RAM 113 indicates that the number of unreceived e-mails is "0" (NO in step S1005), the processing proceeds to step S1007. In a case where the number of unreceived e-mails is equal to or greater than "1" (YES in step S1005), the processing proceeds to step S1006.

In step S1007, the CPU 111 displays a screen indicating non-existence of the e-mail to be received, and the processing proceeds to the log-out processing in step S1016.

On the other hand, in step S1006, the CPU 111 acquires the message number of the e-mail stored in the mail box from the POP server. More specifically, the CPU 111 transmits a LIST command to the POP server and acquires the message number of each e-mail stored in the mail box.

In step S1008, the CPU 111 transmits to the POP server a RETR command in which the message number corresponding to the e-mail to be received is specified and receives the e-mail.

In step S1009, the CPU 111 determines whether the identification information corresponding to the e-mail received in step S1008 is stored in the storage region (FIG. 8B) in the RAM 113. More specifically, the CPU 111 transmits to the POP server a UIDL command in which the message number corresponding to the e-mail received in step S1008 is specified, and acquires the identification information corresponding to that received e-mail. Next, the CPU 111 compares the acquired identification information with the identification information stored in the above-described storage region. As a result of the above comparison, in a case where the acquired identification information coincides with the identification information stored in the storage region (YES in step S1009), the processing proceeds to step S1010. In a case where the acquired identification information does not coincides with any of the identification information stored in the storage region (NO in step S1009), the processing proceeds to step S1011.

In step S1010, the CPU 111 discards the received e-mail, and the processing proceeds to step S1015.

On the other hand, in step S1011, the CPU 111 performs control to feed a sheet used for printing to the printing unit 120 and controls the printing unit 120 to print an image based on the attached file of the e-mail on the sheet. After the printing is executed on the sheet, the processing proceeds to step S1012.

In step S1012, the CPU 111 transmits to the POP server a DELE command in which the message number corresponding to the printed e-mail is specified, and instructs the POP server to delete the corresponding e-mail from the mail box.

In step S1013, according to the response from the POP server, the CPU 111 determines whether deletion of the e-mail has succeeded. In a case where an affirmative response (OK) is received from the POP server, the CPU 111 determines that deletion of the e-mail has succeeded (YES in step S1013), and the processing proceeds to step S1015. In addition, the CPU 111 decrements the number of unreceived e-mails. On the other hand, in a case where the CPU 111 receives a negative response (NG) from the POP server, or the CPU 111 cannot receive a response from the POP server even though a predetermined time has elapsed, or the CPU 111 cannot access the network, the CPU 111 determines that deletion of the e-mail has failed (NO in step S1013), and the processing proceeds to step S1014.

In step S1014, the CPU 111 stores the identification information (UID) of the e-mail that cannot be deleted in step S1012 in the storage region in the RAM 113 illustrated in FIG. 8B. Similar to the second exemplary embodiment, a plurality of pieces of identification information of the e-mails, attached images of which have been printed, but cannot be deleted from the mail server 103, is stored in the storage region illustrated in FIG. 8B.

On the other hand, in step S1015, the CPU 111 determines whether the unreceived e-mail exists. In a case where the information stored in the RAM 113 indicates that the number of unreceived e-mails is equal to or greater than "1" (YES in step S1015), the CPU 111 increments the message number of the e-mail to be received, and then, the processing returns to step S1008. Accordingly, in step S1008, the CPU 111 can receive a next e-mail. On the other hand, in a case where the information stored in the RAM 113 indicates that the number of unreceived e-mails is "0" (NO in step S1015), the processing proceeds to step S1016.

In step S1016, the CPU 111 logs out of the POP server. More specifically, the CPU 111 transmits a QUIT command to the POP server and ends the communication session with the POP server.

As described above, according to the present exemplary embodiment, it is possible to execute control processing of discarding a received e-mail and not executing printing processing in a case where the identification information of the received e-mail coincides with the stored identification information after the e-mail stored in the mail server 103 is received. Accordingly, in a case where the e-mail cannot be deleted from the mail server 103 because of a network failure, an image based on the attached file of the undeleted e-mail can be prevented from being printed repeatedly.

In the first exemplary embodiment, a communication session (e.g., POP3 session) with the POP server has been established and maintained for a period from the reception to the deletion of the e-mail. However, if it takes a long time to delete the e-mail after the reception, communication resources may be consumed more than necessary (i.e., CPU load and memory occupation) by maintaining the communication session. In consideration of this, the communication session may be disconnected after reception of the e-mail and then re-established at a deletion timing.

In a fourth exemplary embodiment, in a case where the communication session is once disconnected after the reception of the e-mail and established again at a deletion timing, the processing described in the first exemplary embodiment is applied.

Figure 11:
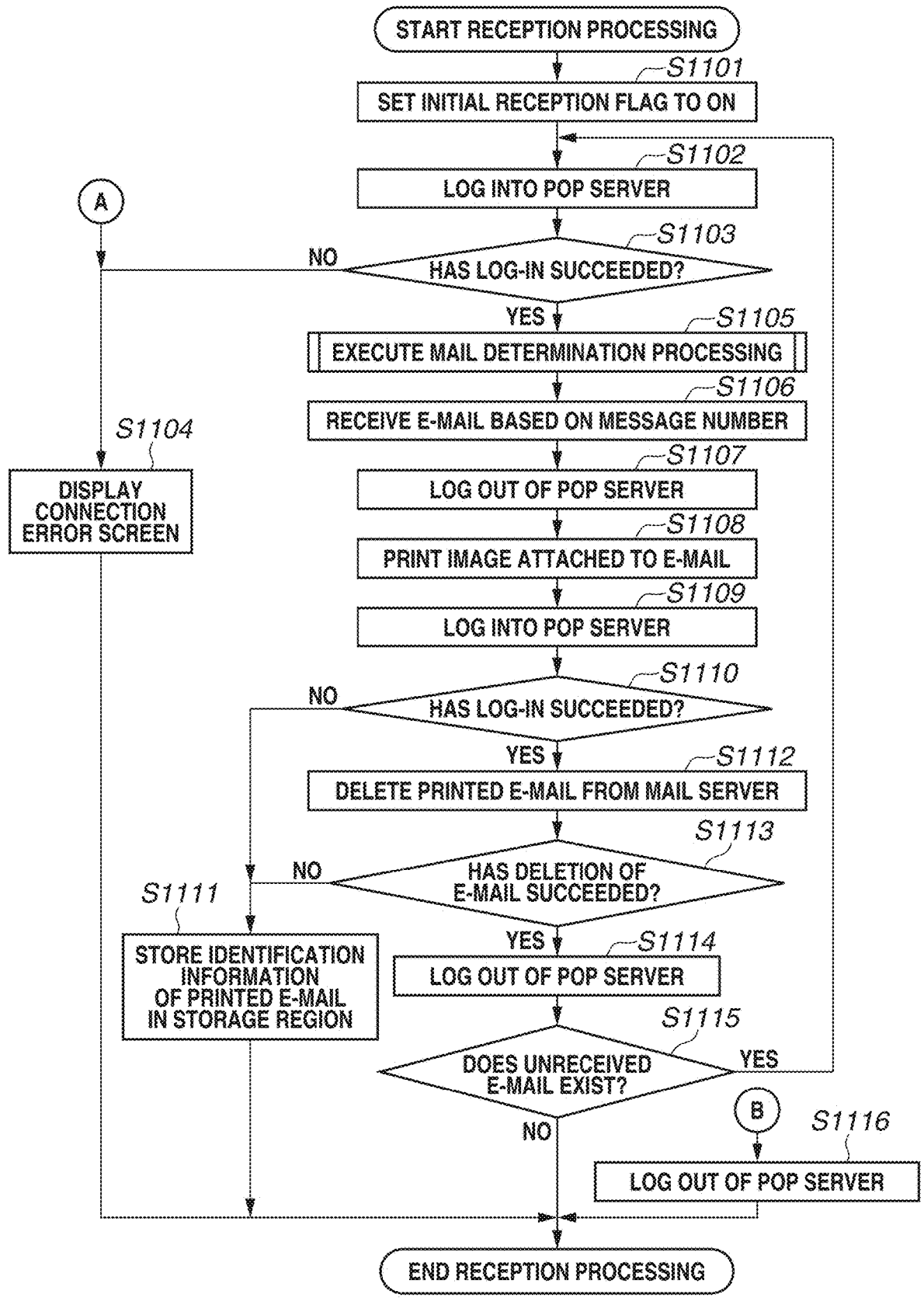
FIG. 11 is a flowchart illustrating control processing for receiving and printing an e-mail.
Figure 12:
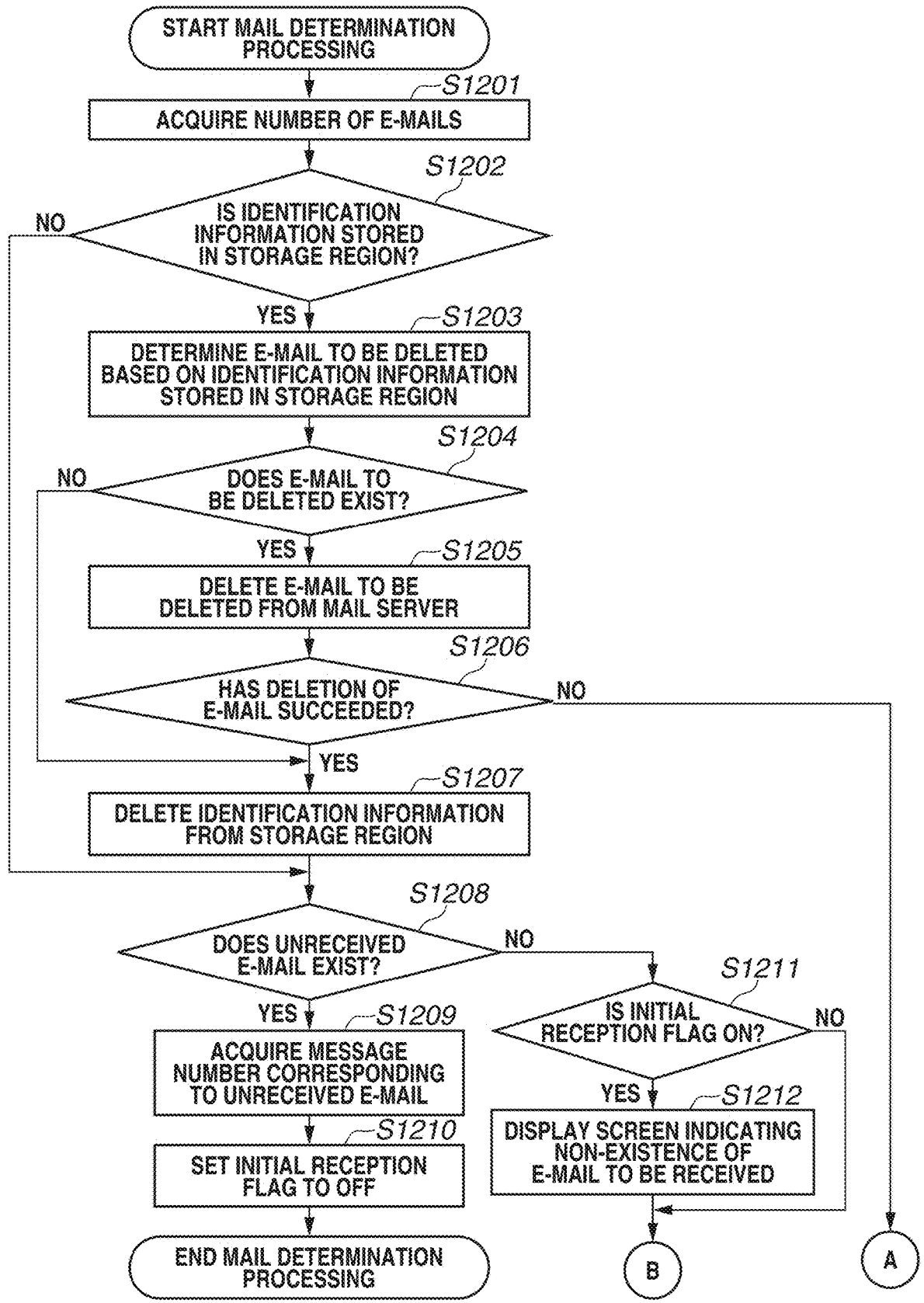
FIG. 12 is a flowchart illustrating control processing for receiving and printing an e-mail.

The specific control will be described with reference to the flowcharts in FIGS. 11 and 12. Respective operations (steps) of the flowcharts illustrated in FIGS. 11 and 12 are realized when the CPU 111 reads, onto the RAM 113, and executes a control program stored in the ROM 112 or the storage unit 114. The CPU 111 executes the control corresponding to the flowchart illustrated in FIG. 11 in a case where an instruction of manually receiving the e-mail is input thereto or the CPU 111 makes an inquiry to the POP server at every automatic reception interval set thereto.

In step S1101, the CPU 111 sets an initial reception flag to ON. The initial reception flag is a flag for determining whether to display a screen (screen 406) for notifying the user of non-existence of the e-mail to be received.

In steps S1102 and S1103, the CPU 111 executes log-in processing with respect to the POP server similar to the log-in processing in steps S501 and S502 described in the first exemplary embodiment. If the log-in processing with respect to the POP server has succeeded (YES in step S1103), the processing proceeds to step S1105. On the other hand, if the log-in processing with respect to the POP server has failed (NO in step S1103), the processing proceeds to step S1104. In step S1104, the CPU 111 displays an error screen and ends the processing.

In step S1105, the CPU 111 determines the e-mail to be received from the POP server. The processing in step S1105 will be described with reference to the flowchart in FIG. 12. The flowchart in FIG. 12 corresponds to the flowchart in FIG. 6 described in the first exemplary embodiment, and control processing relating to initial reception will be executed in addition to the processing illustrated in the flowchart in FIG. 6. Detailed description of the control processing similar to the control processing in the first exemplary embodiment will be omitted.

In steps S1201 to S1207, similar to the steps S601 to S607 described in the first exemplary embodiment, the CPU 111 deletes the e-mail to be deleted based on the identification information stored in the RAM 113. In addition, a symbol "A" in FIG. 12 is connected to a symbol "A" in FIG. 11. Accordingly, in step S1206, in a case where the CPU 111 determines that deletion of the e-mail has failed (NO in step S1206), the processing proceeds to step S1104. Then, in step S1104, the CPU 111 displays an error screen and ends the processing. Further, a symbol "B" in FIG. 12 is connected to a symbol "B" in FIG. 11. Accordingly, in step S1208, in a case where the CPU 111 determines that the unreceived e-mail does not exist (NO in step S1208), the processing proceeds to the log-out processing in step S1116 after the screen indicating non-existence of the e-mail to be received is displayed according to the status.

Next, in step S1208, the CPU 111 determines whether the unreceived e-mail exists. In a case where the information stored in the RAM 113 indicates that the number of unreceived e-mails is "0" (NO in step S1208), the processing proceeds to step S1211. In a case where the number of unreceived e-mails is equal to or greater than "1" (YES in step S1208), the processing proceeds to step S1209.

In step S1211, if the initial reception flag is "ON" (YES in step S1211), the processing proceeds to step S1212. If the initial reception flag is "OFF" (NO in step S1211), the processing in step S1212 is skipped, and the processing proceeds to step S1116 indicated by the symbol "B" in FIG. 11.

On the other hand, in step S1209, the CPU 111 acquires the message number of the unreceived e-mail. More specifically, the CPU 111 generates a reception list in which the message number corresponding to the unreceived e-mail is associated with the identification information (UID) of that e-mail, and stores the reception list in the RAM 113. When the CPU 111 has acquired the message number of the unreceived e-mail, the processing proceeds to step S1210.

Next, in step S1210, the CPU 111 sets the initial reception flag to OFF and ends the processing for determining the e-mail to be received, and the processing proceeds to step S1106.

Next, in step S1106, the CPU 111 transmits to the POP server a RETR command in which the message number corresponding to the e-mail to be received is specified and receives the e-mail. In the present exemplary embodiment, even if a plurality of unreceived e-mails exists, the CPU 111 receives one e-mail from among a plurality of the unreceived e-mails. After the e-mail is received, the processing proceeds to step S1107. In step S1107, the CPU 111 logs out of the POP server. More specifically, the CPU 111 transmits a QUIT command to the POP server and ends the communication session with the POP server.

In step S1108, the CPU 111 decodes the file attached to the e-mail and generates an image used for printing. Next, the CPU 111 executes control to feed a sheet used for printing to the printing unit 120 and controls the printing unit 120 to print the generated image on the sheet. After the printing is executed on the sheet, the processing proceeds to step S1109.

In steps S1109 and S1110, similar to the steps S1102 and S1103, the CPU 111 executes the log-in processing. If the log-in processing has succeeded (YES in step S1110), the processing proceeds to step S1112, and if the log-in processing has failed (NO in step S1110), the processing proceeds to step S1111.

In step S1112, the CPU 111 deletes the printed e-mail from the POP server. The CPU 111 transmits a UIDL command to the POP server, and acquires identification information and the message number of each e-mail stored in the mail box. Next, the CPU 111 acquires the message number of the e-mail corresponding to the identification information coinciding with the identification information of the printed e-mail. Further, the CPU 111 transmits to the POP server a DELE command in which the message number corresponding to the printed e-mail is specified, and instructs the POP server to delete the corresponding e-mail from the mail box.

When deletion processing is executed in step S1112, the message number of the e-mail stored in the mail box is acquired again. This is because the reception of the e-mail in steps S1105 and S1106 and the deletion of the e-mail in step S1112 may be executed in different communication sessions. Because the message number is valid in one communication session, another message number may be assigned thereto if the deletion processing is executed by establishing another communication session. Accordingly, in step S1112, the message number of the e-mail to be deleted is acquired again based on the identification information.

In step S1113, in a case where an affirmative response (OK) is received from the POP server, the CPU 111 determines that deletion of the e-mail has succeeded (YES in step S1113), and the processing proceeds to step S1114. In addition, the CPU 111 decrements a value representing the number of unreceived e-mails stored in the RAM 113. On the other hand, in a case where the CPU 111 receives a negative response (NG) from the POP server, or the CPU 111 cannot receive a response from the POP server even though a predetermined time has elapsed, or the CPU 111 cannot access the network, the CPU 111 determines that deletion of the e-mail has failed (NO in step S1113), and the processing proceeds to step S1111. In step S1111, the CPU 111 stores the identification information (UID) of the e-mail that cannot be deleted in step S1016 in the storage region (FIG. 8A) of the RAM 113.

On the other hand, in step S1114, the CPU 111 logs out of the POP server. In step S1115, the CPU 111 determines whether the unreceived e-mail exists. In a case where the information stored in the RAM 113 indicates that the number of unreceived e-mails is equal to or greater than "1" (YES in step S1115), the processing returns to step S1102, and the CPU 111 receives a next e-mail and executes printing processing of an image based on the attached file of the e-mail. On the other hand, in a case where the information stored in the RAM 113 indicates that the number of unreceived e-mails is "0" (NO in step S1115), the CPU 111 ends the processing.

As described above, in the present exemplary embodiment, in addition to the processing described in the first exemplary embodiment, processing for controlling the communication is executed to establish the communication session with the POP server every time the MFP 101 needs to communicate with the POP server. Accordingly, it is possible to prevent the communication resources from being consumed more than necessary.

In addition, the communication control in which the communication session is once disconnected after the reception of the e-mail and established again at a deletion timing, which is described in the present exemplary embodiment, can be also applied to the second and the third exemplary embodiments.

Other Exemplary Embodiment

According to the control described in the first and the fourth exemplary embodiments, the reception print function has been executed in such a manner that the processing of receiving one e-mail and the processing of deleting the one e-mail after printing the image based on the attached file are executed repeatedly. However, the configuration is not limited thereto.

For example, in the first exemplary embodiment, in a case where a plurality of unreceived e-mails exists, a plurality of e-mails may be received in step S506 collectively. In addition, the number of e-mails to be received may be changed as appropriate based on a size of the e-mail or a region in which a file attached to the received e-mail is decoded. Furthermore, in the control described in the second and the third exemplary embodiments, a plurality of e-mails may be collectively received from the mail server 103 through steps of executing reception processing of e-mails (i.e., steps S506 and S1008).

Further, according to the control described in the second and the third exemplary embodiments, the e-mails attached images of which have been printed, but cannot be deleted from the mail server 103, will remain in the mail server 103 continuously. In such a case, there is a risk in which capacity-over may occur in the mail box, and thus the mail server 103 cannot receive a new e-mail. Further, according to the first and the fourth exemplary embodiments, there is also a risk in which the e-mails may remain in the mail server 103 continuously.

In order to solve the above problem, a function of manually deleting the e-mails stored in the mail box may be provided. FIGS. 9A and 9B are diagrams illustrating examples of setting screens displayed on the panel 320 of the operation unit 116 by the CPU 111, whereas FIG. 9A is a diagram illustrating setting screens relating to the e-mail.

The user can make a setting relating to the mail server 103 through the setting screens illustrated in FIG. 9A. An option 901 is used when the e-mail stored in the mail box is deleted. The CPU 111 displays a deletion screen 902 in a case where the option 901 is specified through the operation unit 116. When the CPU 111 determines that an OK key has pressed in the deletion screen 902, the CPU 111 deletes the e-mail stored in the mail box.

More specifically, the CPU 111 transmits a STAT command to the POP server and acquires the number of e-mails stored in the mail box. Next, the CPU 111 transmits a LIST command to the POP server and acquires the message numbers of all of the e-mails stored in the mail box. Further, the CPU 111 transmits a DELE command in which the acquired message number is specified, and instructs the POP server to delete the corresponding e-mail from the mail box. In a case where a plurality of e-mails is stored therein, the CPU 111 deletes a plurality of e-mails from the mail server 103 by repeatedly transmitting the DELE command in which each message number is specified.

Further, in a case where all of the e-mails within the mail box are deleted through the screen in FIG. 9A, the identification information (UID) stored in the storage region in the RAM 113 is no longer necessary. Accordingly, the CPU 111 may initialize the storage region in which the identification information is stored at a timing at which the e-mail is deleted from the mail box. Further, the storage region in which the identification information is stored may be initialized in a case where the address of the POP server or the user ID for logging into the POP server is changed.

Further, according to the present exemplary embodiment, although all of the e-mails stored in the mail box have been deleted, is not limited thereto. For example, the e-mail corresponding to the identification information stored in the storage region in the RAM 113 may be selected and deleted. In this case, only the e-mail identification information of which is stored (i.e., e-mail which does not have to be printed) can be deleted without deleting the unreceived e-mail stored in the mail box.

As described above, it is possible to provide the user with a method for easily deleting the e-mail that is not deleted from the mail box of the mail server and left continuously.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to aspects of the present invention, even in a case where a network failure has occurred, an image based on the attached file of the e-mail can be prevented from being printed repeatedly.

While aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

This application claims the benefit of Japanese Patent Application No. 2015-088798, filed Apr. 23, 2015, which is hereby incorporated by reference herein in its entirety.

What is claimed is:

1. An image forming apparatus, comprising:
a network interface that receives an electronic mail from a mail server; and
a printer that prints an image based on a file attached to the received electronic mail,
wherein the network interface transmits, to the mail server, a predetermined request for deleting the electronic mail of which file has been printed from the mail server after printing of the image based on the file of the received electronic mail is completed by a printing unit, wherein the electronic mail of which the file has been printed is deleted from the mail server based on the predetermined request, and
wherein the network interface transmits, based on identification information of the electronic mail which has not been deleted from the mail server based on the predetermined request, another predetermined request for deleting the electronic mail from the mail server.

2. The image forming apparatus according to claim 1, further comprising a processor that establishes a communication session with the mail server before the electronic mail is received, disconnects the communication session after the electronic mail is received, and establishes a new communication session before the electronic mail is deleted.

3. The image forming apparatus according to claim 1, further comprising an operation panel,
wherein the network interface transmits, to the mail server, the predetermined request in a case where an instruction to delete an electronic mail is received via the operation panel.

4. The image forming apparatus according to claim 1, further comprising a display that displays an error in a case where the electronic mail is not deleted based on the predetermined transmitted based on the identification information of the electronic mail which has not been deleted from the mail server based on the predetermined request.

5. A control method for an image forming apparatus, comprising:
receiving an electronic mail from a mail server;
printing an image based on a file attached to the received electronic mail;
transmitting, to the mail server, a predetermined request for deleting the electronic mail of which file has been printed from the mail server after printing of the image based on the file of the received electronic mail is completed by a printing unit, wherein the electronic mail of which the file has been printed is deleted from the mail server based on the predetermined request; and
transmitting, based on the identification information of the electronic mail which has not been deleted from the mail server based on the predetermined request, another predetermined request for deleting the electronic mail from the mail server.

6. A non-transitory computer-readable storage medium storing computer executable instructions for causing a computer to execute a control method for controlling an image forming apparatus,
receiving an electronic mail from a mail server;
printing an image based on a file attached to the electronic mail;
transmitting, to the mail server, a predetermined request for deleting the electronic mail of which file has been printed from the mail server after printing of the image based on the file of the received electronic mail is completed by a printing unit, wherein the electronic mail of which the file has been printed is deleted from the mail server based on the predetermined request; and
transmitting, based on the identification information of the electronic mail which has not been deleted from the mail server based on the predetermined request, another predetermined request for deleting the electronic mail from the mail server.

7. The image forming apparatus according to claim 1, wherein identification information of the electronic mail of which file has been printed is designated for the predetermined request.

8. The image forming apparatus according to claim 1, wherein the identification information of the electronic mail which has not been deleted from the mail server by the predetermined request is designated for the another predetermined request.

9. The image forming apparatus according to claim 1, wherein the predetermined request is a deletion request and the another predetermined request is another deletion request.

10. The image forming apparatus according to claim 1, wherein the identification information is Unique Identifier.

11. The image forming apparatus according to claim 1, wherein the network interface transmits the another predetermined request if a response to the predetermined request transmitted by the network interface is not received by the network interface in a predetermined period.

12. The image forming apparatus according to claim 1, wherein the network interface transmits the another predetermined request if a negative response to the predetermined request transmitted by the network interface is received by the network interface.

13. The image forming apparatus according to claim 1, wherein the mail server is a POP server.

14. The image forming apparatus according to claim 1, wherein the network interface transmits, to the mail server, an inquiry for receiving the electronic mail at each interval set for the image forming apparatus.

15. The image forming apparatus according to claim 1, wherein the network interface transmits user information and password to the mail server for receiving the electronic mail from the mail server.

* * * * *